United States Patent [19]
Machida et al.

[11] Patent Number: 4,719,812
[45] Date of Patent: Jan. 19, 1988

[54] TRANSMISSION CASING INCLUDING A HYDRAULIC CLUTCH

[75] Inventors: Satoshi Machida, Sennan; Shigekazu Hasegawa; Tetsu Fukui, both of Sakai; Yoshimi Oota, Osaka, all of Japan

[73] Assignee: Kubota, Ltd., Osaka, Japan

[21] Appl. No.: 852,684

[22] Filed: Apr. 16, 1986

[30] Foreign Application Priority Data

Aug. 29, 1985 [JP] Japan ................................. 60-190527
Aug. 30, 1985 [JP] Japan ................................. 60-192336
Aug. 30, 1985 [JP] Japan ................................. 60-192337
Aug. 30, 1985 [JP] Japan ................................. 60-133321

[51] Int. Cl.$^4$ .............................................. F16H 5/40
[52] U.S. Cl. ....................................... 74/335; 74/336.5; 74/337; 74/606 R
[58] Field of Search .................. 74/335, 336 R, 336.5, 74/337, 606 R

[56] References Cited

U.S. PATENT DOCUMENTS

| | | | |
|---|---|---|---|
| 2,187,835 | 1/1940 | Martin | 74/337 |
| 3,491,862 | 1/1970 | Tanzer | 74/337 X |
| 4,261,227 | 4/1981 | Yamamori et al. | 74/606 R X |
| 4,326,433 | 4/1982 | Black et al. | 74/335 X |
| 4,364,285 | 12/1982 | Morisawa et al. | 74/606 R |
| 4,603,596 | 8/1986 | Akashi et al. | 74/336 R |

FOREIGN PATENT DOCUMENTS

| 85498 | 8/1983 | European Pat. Off. | 74/335 |
|---|---|---|---|
| 22455 | 2/1982 | Japan | 74/606 R |

Primary Examiner—Leslie Braun
Assistant Examiner—Dwight G. Diehl
Attorney, Agent, or Firm—Edwin E. Greigg

[57] ABSTRACT

A hydraulic construction for a working vehicle comprising a transmission case housing a hydraulic clutch and defining a lateral opening, and hydraulic control device mounted on an inner face of a cover attached to the transmission case to close the opening, the hydraulic control device acting to control oil flows to the hydraulic clutch. The hydraulic control device is hydraulically connectable to oil passage device connected to the hydraulic clutch when the cover is attached to the transmission case.

11 Claims, 10 Drawing Figures

TRANSMISSION CASING INCLUDING A HYDRAULIC CLUTCH

BACKGROUND OF THE INVENTION

The present invention relates to a hydraulic construction for a working vehicle, for operating a hydraulic clutch mounted in a transmission case.

An oil passage for supplying oil to a rotary member such as a hydraulic clutch generally is defined axially of a rotary shaft connected to the rotary member. The oil is supplied to and drained from the oil passage thus defined, through a port defined adjacent an end of the rotary shaft.

However, the oil passage defined along the rotary shaft tends to be long and is difficult to cut and shape. It also has the disadvantage of an increased flow resistance. Particularly where a hydraulic clutch is operated by a hydraulic actuator, the increased flow resistance is deterimental to prompt clutch operation and causes delays or lags in the associated operation.

SUMMARY OF THE INVENTION

The object of the invention is to provide a simple hydraulic construction for causing the hydraulic clutch to operate promptly, by rationally arranging hydraulic devices and others for controlling the hydraulic clutch and by rationally providing an oil passage for supplying oil to the hydraulic clutch.

According to one aspect of the invention, a hydraulic construction for a working vehicle comprises a transmission case housing a hydraulic clutch and defining a lateral opening and hydraulic control means mounted on an inner face of a cover attached to the transmission case to close the opening, the hydraulic control means acting to control oil flows to the hydraulic clutch, wherein the hydraulic control means is hydraulically connectable to oil passage means connected to the hydraulic clutch when the cover is attached to the transmission case.

The above construction permits the hydraulic clutch and the hydraulic control means by the shortest possible line in contrast with the roundabout connecting line to control oil flow through a port at an end of the shaft. Moreover, the connecting structure is simplified by the arrangement that the hydraulic clutch and the hydraulic control means are interconnecting at a time of attaching the cover to the transmission case.

BRIEF DESCRIPTION OF THE DRAWINGS

The above and other objects and features of the present invention will become apparent from the following description taken in conjunction with the preferred embodiment thereof with reference to the accompanying drawings, in which.

DESCRIPTION OF THE PREFERRED EMBODIMENTS

Figure 1:
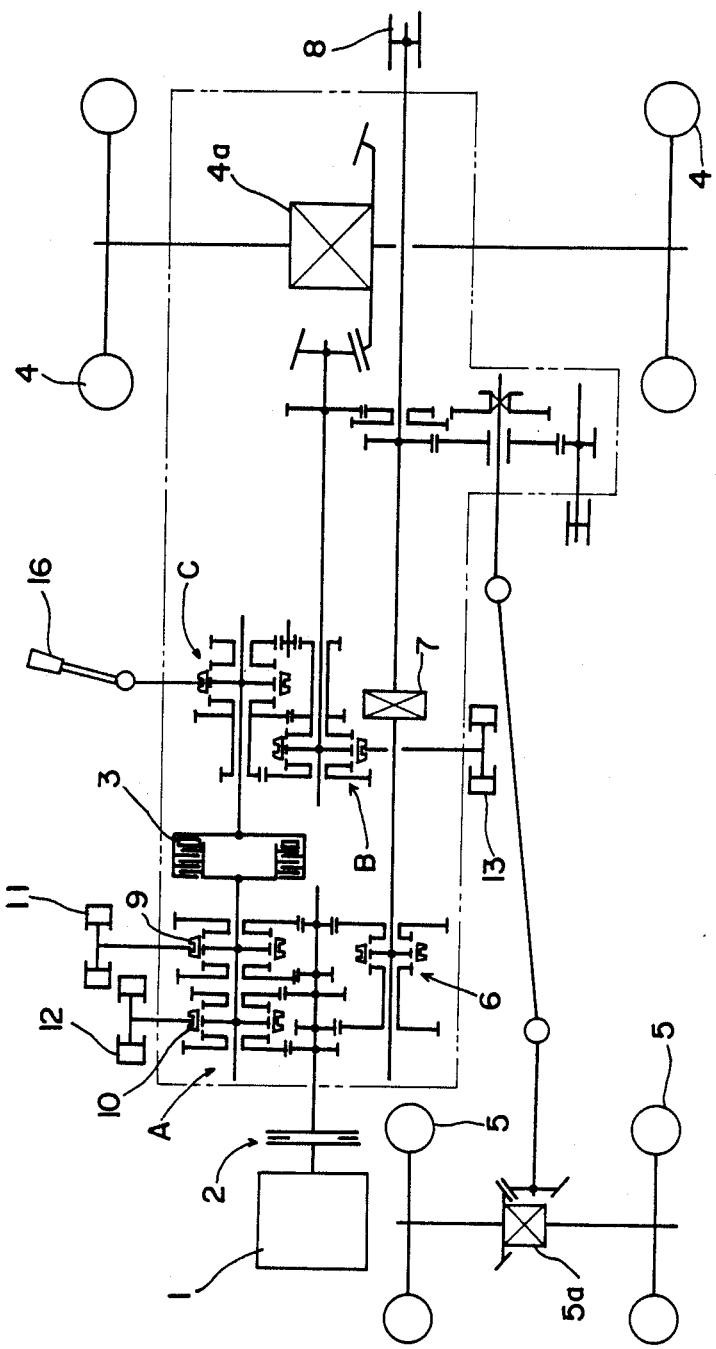
FIG. 1 is a schematic view of a transmission structure of an agricultural tractor.

Referring to FIG. 1, the propelling drive transmission line of a four wheel drive agricultural tractor comprises a main change speed device A, a multidisk type hydraulic clutch 3, an auxiliary change speed device B and a backward and forward drive switching device C arranged in series to receive power of an engine 1 through a main clutch 2. An output of the backward and forward drive switching device C is divided for transmission to a differential 4a for driving rear wheels 4 and to a differential 5a for driving front wheels 5. The power takeoff line comprises a change speed device 6, a unidirectional rotary clutch 7 and a power takeoff shaft 8 arranged in series to receive the power of the engine 1 through the main clutch 2.

The main change speed device A includes two synchromesh change speed gear mechanisms 9 and 10 and provides four speeds. The auxiliary change speed device B and backward and forward drive switching device C also include synchromesh change speed gears and share part of the gears therebetween.

Figure 2:
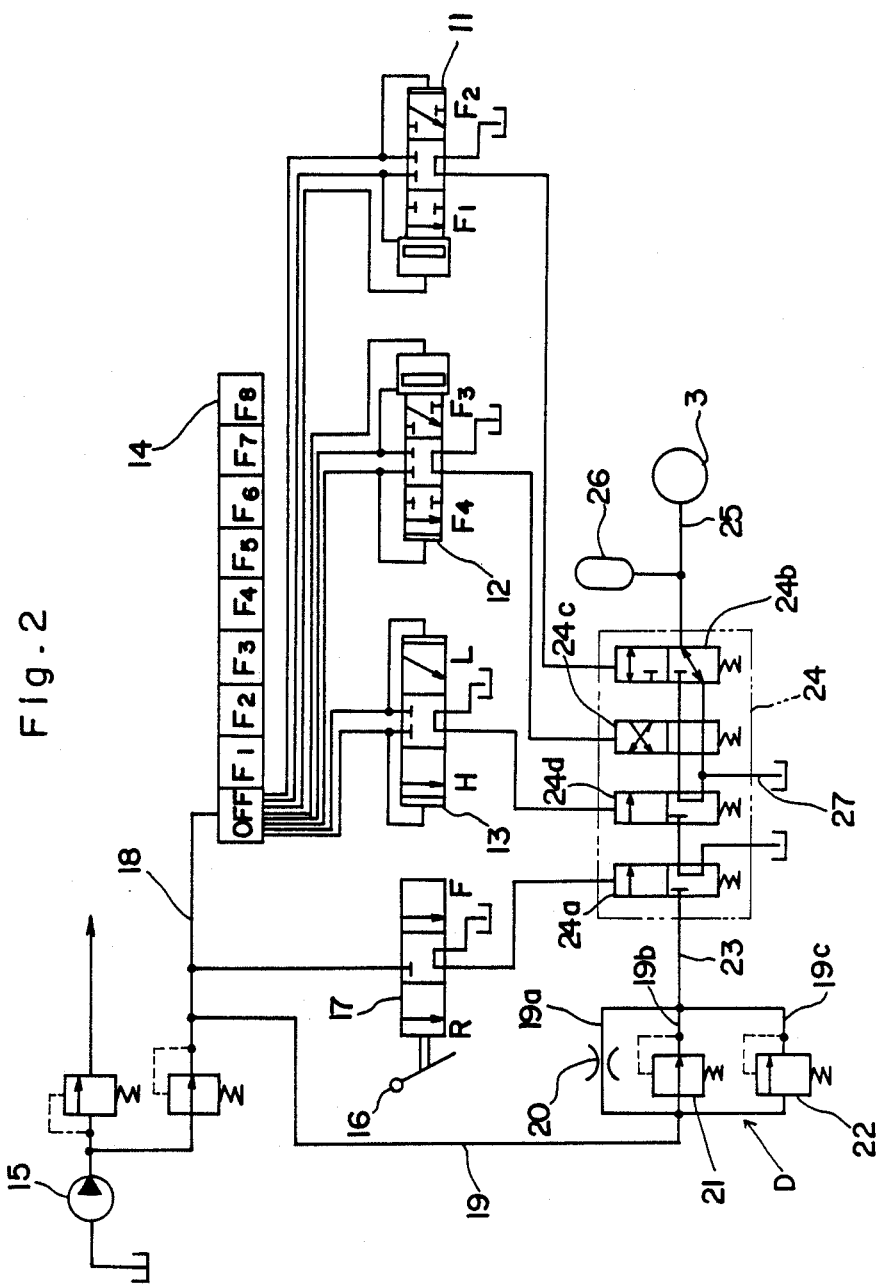
FIG. 2 is a diagram of a hydraulic circuitry for effecting speed changes.
Figure 3:
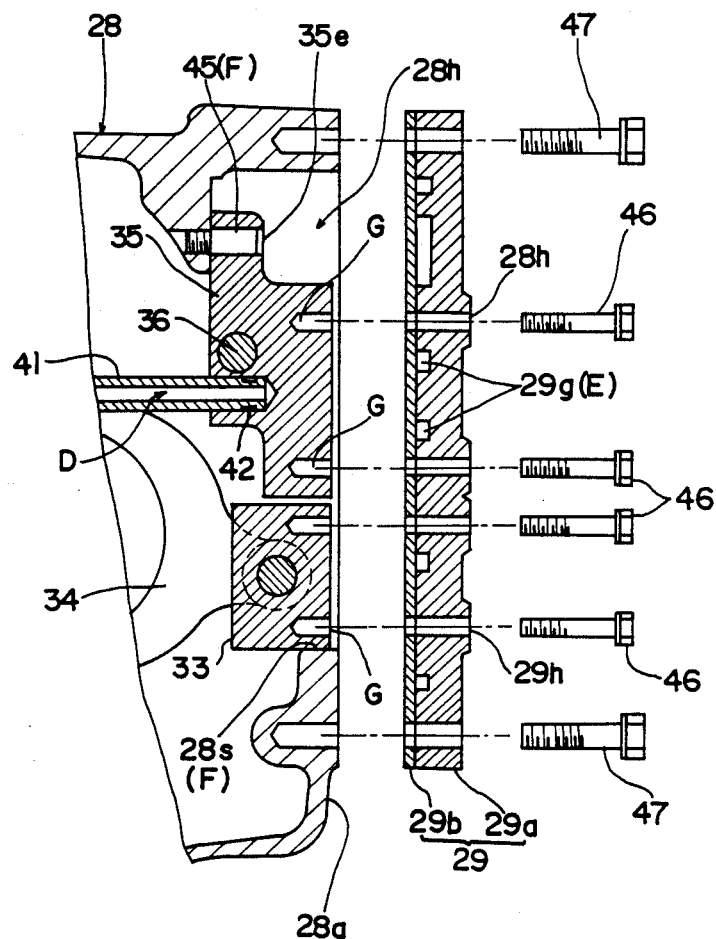
FIG. 3 is a view in vertical section of a transmission case with a cover about to be attached thereto.
Figure 4:
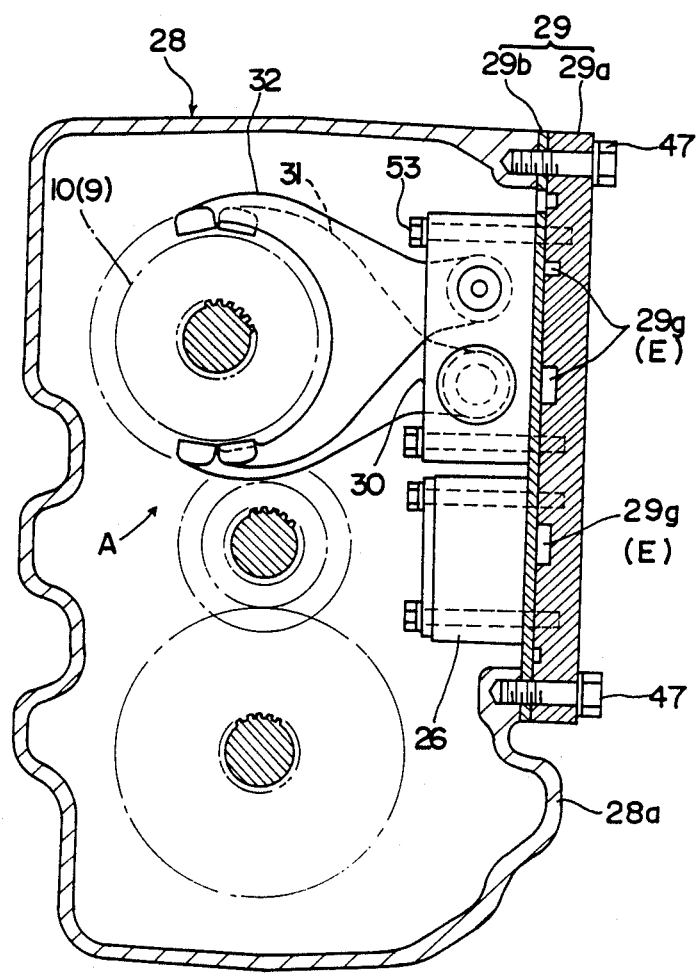
FIG. 4 is a view in vertical section of a main change speed section of the transmission case with the cover attached thereto.
Figure 5:
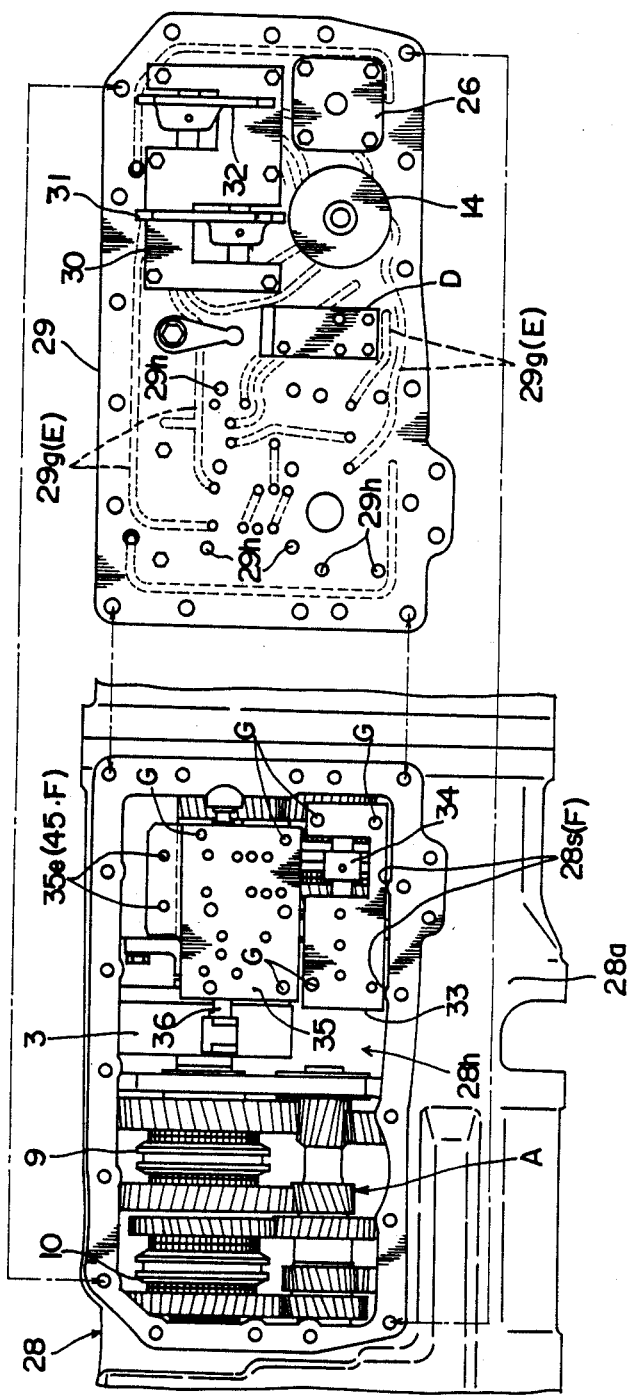
FIG. 5 is a side view of the transmission case with the cover shown as exploded.
Figure 6:
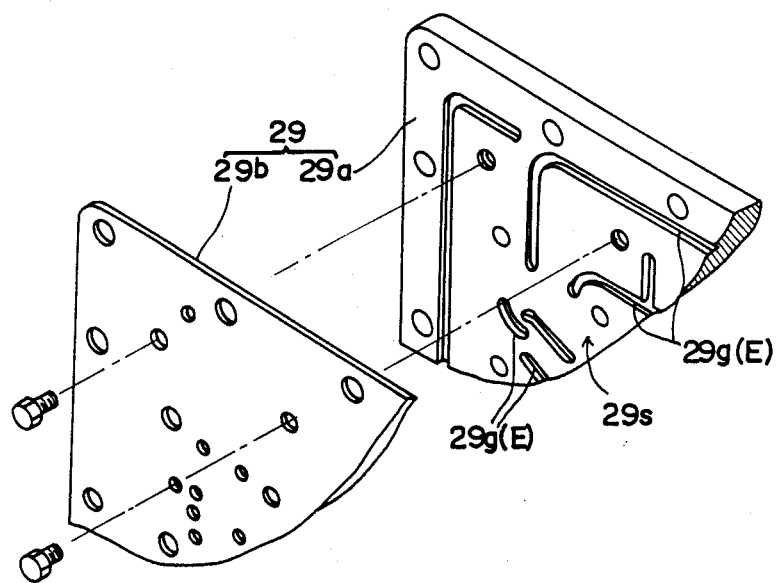
FIG. 6 is a perspective view showing a group of oil passages.

As shown in FIGS. 1 and 2, the main change speed device A and the auxiliary change speed device B are shiftable by two hydraulic cylinders 11 and 12 and by one hydraulic cylinder 13, respectively. The three hydraulic cylinders 11, 12 and 13 are actuated by pressure oil supplied from a hydraulic pump 15 through a propelling drive change speed valve 14.

The change speed valve 14 is the rotary type and is operable to effect an eight-step speed changing through a combination of the main change speed device A and auxiliary change speed device B.

Each of the three hydraulic cylinders 11, 12 and 13 comprises a switch valve having three operative positions, and is adapted to produce a pilot pressure when shifted to a position other than neutral.

However, the hydraulic cylinder 13 for operating the auxiliary change speed device B is shiftable to only two positions, namely a low speed position L and a high speed position H, and its neutral position is effective only in the course of its shifting operation.

The backward and forward drive switching device C is manually operated by means of a rocking hand lever 16, and the manual operating line therefor includes a hydraulic valve 17. This hydraulic valve 17 is adapted to produce a pilot pressure when shifting the backward and forward drive switching device C to a forward drive position F or a reverse drive position R.

The hydraulic clutch 3 is engageable by oil pressure supplied thereto. An oil passage 18 extending from the hdyraulic pump 15 is branched into two passages, one passage extending to the change speed valve 14 and the other passage extending to the hydraulic clutch 3 via line 19.

The hydraulic clutch 3 is automatically disengaged when one of the main change speed device A, auxiliary change speed device B and backward and forward drive switching device C is operated, and is automatically engaged again when the operation is completed. Therefore, the change speed operation is effected without disengaging the main clutch 2.

More particularly, a pressure control device D is mounted on the oil passage 19, which comprises a throttle valve 20, a first valve mechanism 21 and a second valve mechanism 22 mounted respectively on three flow passages 19a, 19b and 19c branched from the oil passage 19. The first valve mechanism 21 is closed when the pilot pressure from the hydraulic clutch reaches a predetermined value, and the second valve mechanism 22 is opened when the pilot pressure from the hydraulic clutch exceeds the predetermined value. An oil passage 23 extending from the pressure control device D includes a group of logical valves 24 including four logical valves 2a-24d operable by the pilot pressures from the hdyraulic valve 17 and the three hydraulic cylinders 11, 12 and 13, respectively. Further, an accumulator 26 is mounted on an oil passage 25 extending from the logical valves 24 to the hydraulic clutch 3.

When the main change speed device A is operated to run the tractor, the logical valves 24 are opened to maintain the hydraulic clutch 3 engaged. When either the main change speed device A, auxiliary change speed device B or backward and forward drive switching device C is switched while the tractor is running, the pilot pressures from these switch valves drop in the course of the switching operation whereby the logical valves 24 break the oil supply from the hydraulic pump 15 and at the same time permit the oil to flow into a drain passage 27 thereby to disengage the hydraulic clutch 3. When the switching operation is completed, the logical valves 24 are opened again to engage the hydraulic clutch 3.

Referring to FIGS. 3 through 6, a transmission case 28 housing the described transmission defines an opening 28h in a wall 28a thereof, and a cover carrying the hydraulic devices on an inner face thereof is attachable to the transmission case 28 to close the opening 28h. The cover 29 comprises two plate members 29a and 29b, one of the plate members 29a defines a plurality of oil flow grooves 29g constituting a group of oil passages E on a mating face 29s thereof.

The two hydraulic cylinders 11 and 12 for effecting the main speed changes are housed in a single main change speed unit 30 which includes two shift forks 31 and 32 operable by the respective cylinders 11 and 12. The hydraulic cylinder 13 for effecting the auxiliary speed changes is housed in an auxiliary change speed unit 33 which includes a shift fork 34 operable by the hydraulic cylinder 13.

Each of the change speed valve 14, pressure control device D, accumulator 26 is mounted in a single case. The logical valves 24 are mounted together with the hydraulic valve 17 of the backward and forward drive switching device D in a logical valve unit 35. This unit 35 is penetrated by a shift rod 36 operable by the lever 16.

The main change speed unit 30, auxiliary change speed unit 33, change speed valve 14, pressure control device D, accumulator 26, and logical valve unit 35 are mounted on the inner face of the cover 29 in communication with the group of oil passages E. These oil passages E comprises the described oil passages 18, 19, 23, etc.

The described oil passage construction includes a short oil passage J for operating the hydraulic clutch 3 to effect the speed changes promptly.

Figure 7:
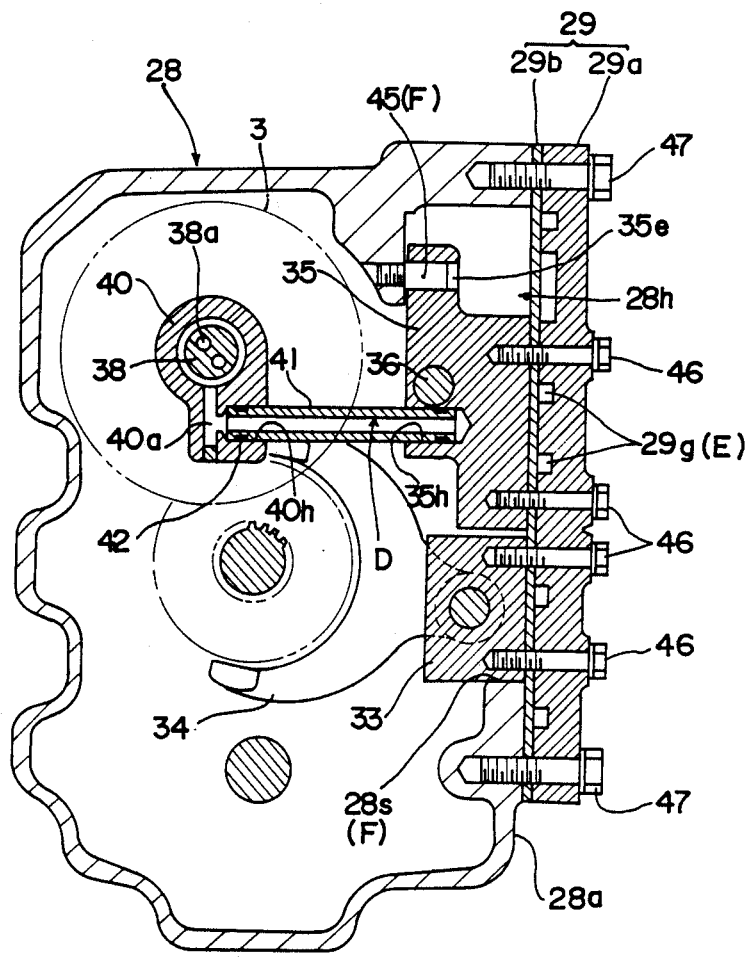
FIG. 7 is a view in vertical section of the transmission case showing how an oil pipe is mounted.
Figure 8:
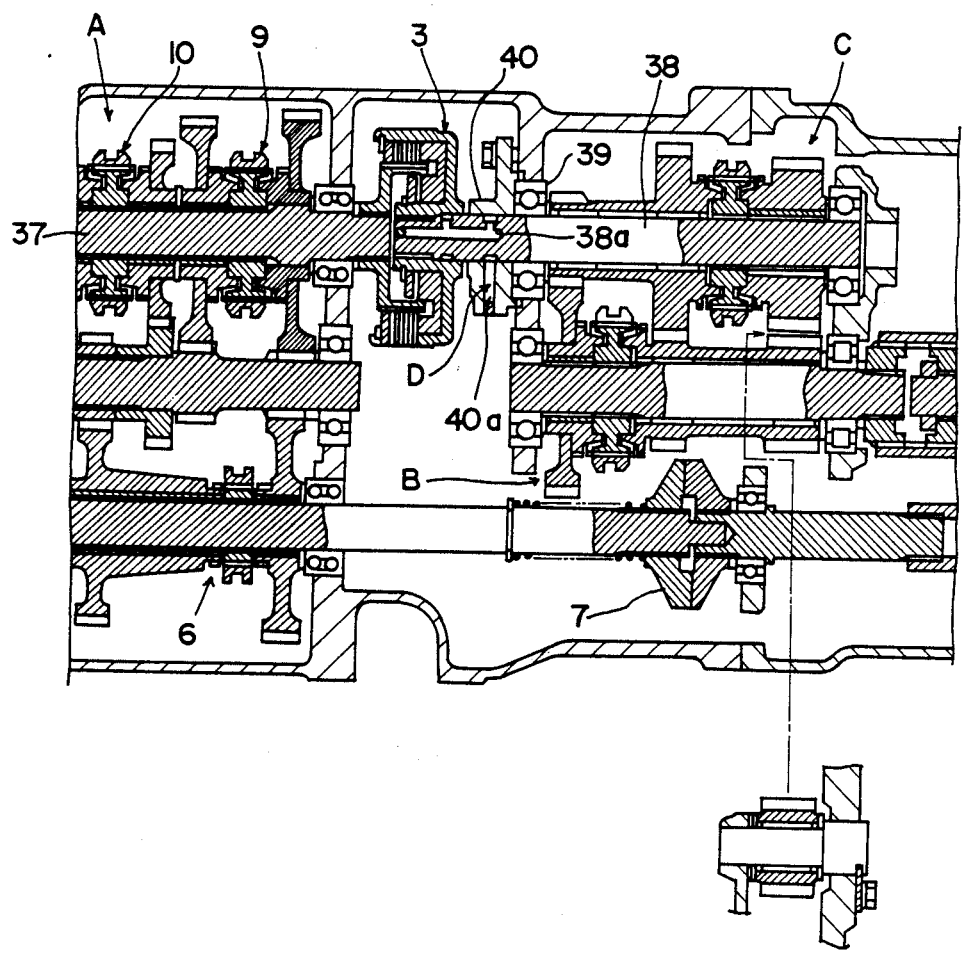
FIG. 8 is a side view in vertical section of the transmission case.

As shown in FIGS. 7 and 8, the hydraulic clutch 3 is mounted between a transmission shaft 37 for transmitting the power from the main change speed device A to the clutch 3 and a transmission shaft 38 for transmitting the power from the clutch 3 to the auxiliary change speed device B. The oil passage J for supplying oil to the clutch 3 comprises a flow passage 38a defined axially of the output transmission shaft 38, a flow passage 40a defined in a supporting boss 40 of a bearing 39 for supporting the transmission shaft 38 to communicate with the flow passage 38a, and an oil pipe 41 bridging the supporting boss 40 and the logical valve unit 35 to communicate with the flow passage 40a. The oil pipe 41 is connected by the following construction.

It is also possible to define the first oil passage in the input shaft and to define the second oil passage in the supporting boss of a bearing for supporting the input shaft.

The supporting boss 40 includes an opening 40h communicating with the flow passage 40a, and the logical valve unit 35 includes an opening 35h opposed to the opening 40h and communicating with an oil pasage defined in the logical valve unit 35 for supplying oil to the hydraulic cylinder 3. The openings 40h and 35h have an axis extending in a direction in which the cover 29 is attached and detached. The oil pipe 41 carries an O-ring 42 at each of the opposite ends thereof which are inserted into the openings 40h and 35h to place the oil pipe 41 in communication.

As seen, the unit 35 housing the auxiliary change speed device B is attached together with the logical valve unit 35 to the inner face of the cover 29 by means of bolts 43. The cover 29 is attached to the transmission case 28 by bolts 44.

Apart from the foregoing connection mode, one end of the oil pipe 41 may be fixed to one of the supporting boss 40 and the logical valve unit 35, the remaining end being inserted to the other.

The hydraulic actuator for effecting the main speed changes may comprise a hydraulic motor instead of the hydraulic cylinder.

The transmission case 28, logical valve unit 35 and auxiliary change speed unit 33 are constructed such that, in order for the cover 29 to be lightweight for attaching to the transmission case 28, the two units 35 and 33 are temporarily fixed inside the transmission case 28 and are attached to the inner face of the cover 29 after the cover 29 is attached to the transmission case 28.

More particularly, the transmission case 28 defines therein a temporary mount F comprising two knock pins 45 extending through two perforations 35h defined in the logical valve unit 35 for temporarily supporting the unit 35 in a substantially final position and a temporary mount F comprising a carrier surface 28s for supporting the auxiliary change speed unit 33. Each of the two units 35 and 33 defines a plurality of bolt-receiving holes G extending toward the cover 29. After the units 35 and 33 are placed in position in the transmission case 28, the cover 29 is attached to the transmission case 28, bolts 46 are inserted through perforations 29h defined in the cover 29 and into the holes G of the units 35 and 33, and the bolts 46 are tightened whereby the units 35 and 33 are fixed to the inner face of the cover 29.

It will be understood that the various units attached to the cover 29 as described above serve to reinforce the cover 29.

The units other than the foregoing two units 35 and 33 are prefixed to the inner face of the cover 29, and a plurality of bolts 47 are used to attach the cover 29 to the transmission case 28.

Figure 10:
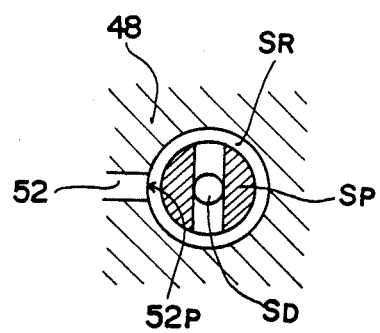
FIG. 10 is a view in vertical section showing a pilot passage and a pilot port.
Figure 9:
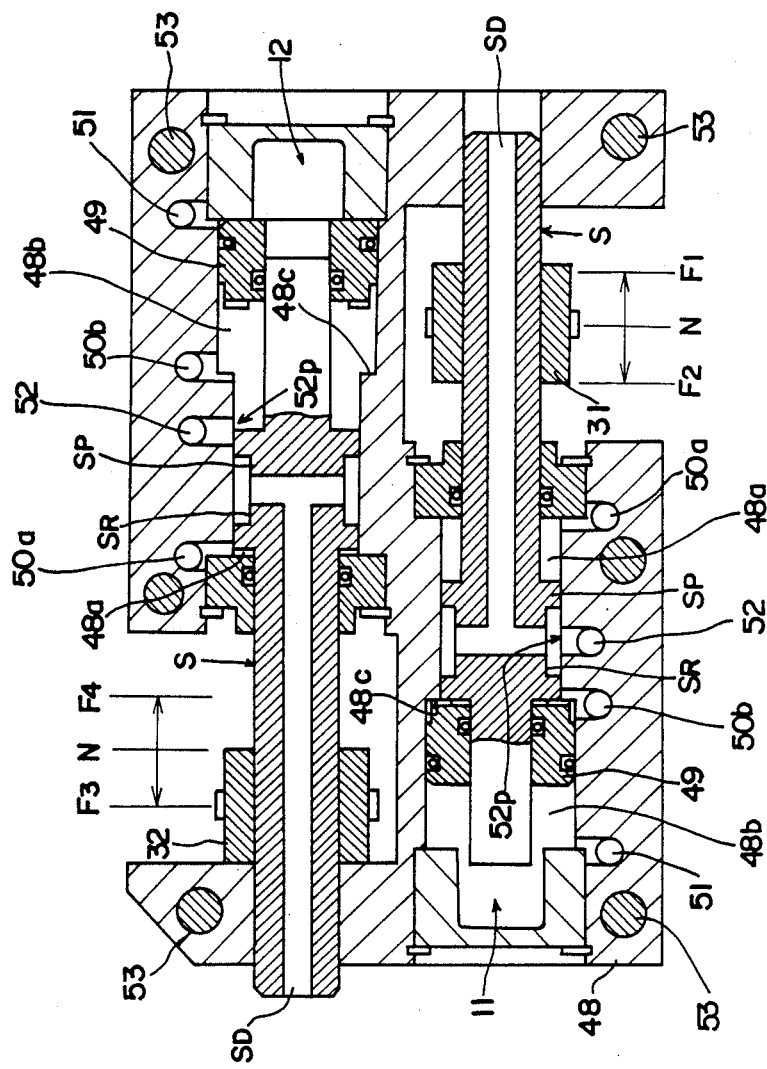
FIG. 9 is a view in vertical section showing hydraulic cylinders for effecting speed changes.

Referring to FIGS. 9 and 10, the hydraulic cylinders 11 and 12 for operating the main change speed device A are housed in a casing 48 of the main change speed unit 30 and include spools S of identical construction.

More particularly, each of the hydraulic cylinders 11 and 12 comprises a spool S defining a piston portion SP at an intermediate position thereof, an oil chamber 48a defined in one of shifting directions of the piston portion SP, an oil chamber 48b opposed to the oil chamber 48a across the piston portion SP and having a larger diameter than the oil chamber 48a, and a movable piston 49 fitted in the larger oil chamber 48b to be engageable with one end of the spool S. The larger oil chamber 48b includes a stepped portion 48c at an end thereof adjacent the piston portion SP. The piston portion SP defines an annular groove SR at an axially intermediate position thereof. The spool S defines a drain passage SD extending axially thereof and communicating with the annular groove SR.

The casing 48 defines two oil passages 50a and 50b for reciprocating the spool S and an oil passage 51 for causing the movable piston 49 to engage the stepped portion 48c. The casing 48 further defines a single pilot port 52p which communicates with the annular groove SR when the spool S is in a neutral position N, and a pilot passage 52 in communication with the pilot port 52p.

The movable piston 49 has a larger pressure receiving area than the piston portion SP. A shift fork 31 or 32 is mounted on each piston portion SP, which is actuated by supplying oil to only one of the two oil passages 50a and 50b. When oil is supplied to the oil passage 51 to cause the movable piston to engage the stepped portion 48c and at the same time oil is supplied to the oil passage 50a to drive the spool S toward the movable piston, the shift fork 31 or 32 is maintained in the neutral position N by virtue of the engagement between the movable piston 49 and the piston portion SP as exemplified by the position of the lower spool S in FIG. 9.

Of the two hydraulic cylinders 11 and 12 shown in FIG. 9, the lower cylinder 11 is for providing the first and second speeds and the upper cylinder 12 is for providing the third and fourth speeds. The illustrated position is for providing the third speed.

The hydraulic cylinder 13 for operating the auxiliary change speed device B differs from the hydraulic cylinders 11 and 12 in that the cylinder 13 is not constructed to assume a neutral position, but is the same as the cylinders 11 and 12 in the construction of spool S.

The hydraulic cylinder 13 is contained in a casing 48 defining two oil passages 50a and 50b for reciprocating the spool S, and a pilot passage 52 in communication with a single pilot port 52p. The spool S defines an annular groove SR and a drain passage SD as in the case of the foregoing spool S.

This spool S includes a piston portion SP fitted in a cylindrical portion of the casing 48 with high precision, so that the piston portion SP causes the oil to flow into the pilot port 52p with a minimal oil leakage when operating the hydraulic cylinder 13. To maintain the high precision, bolts 53 used for attaching the casing 48 are arranged to penetrate parts of the casing 48 most remote from the cylindrical portion.

When the spool S is moved to a position other than neutral, part of the supplied oil is transmitted through the pilot passage 52 to the switch valves 24. When the spool S reaches the neutral position, the oil in the pilot passage 52 is drained through the pilot port 52p, the annular groove SR and the drain passage SD.

What is claimed is:

1. A transmission casing including a hydraulic clutch for a working vehicle in which said transmission case includes a lateral opening, a cover attachable to said transmission casing for closing said lateral opening, said hydraulic clutch being disposed on a transmission shaft within said transmission casing, a hydraulic control means mounted on an inner face of said cover attached to said transmission case, said hydraulic control means acting to control oil flow to said hydraulic clutch, said hydraulic control means being connectable to oil passage means connected to said hydraulic clutch when the cover is attached to said transmission case, said hydraulic oil passage means includes a first oil passage operatively connected to the hydraulic clutch, a second oil passage defined in a stationary member disposed adjacent said transmission shaft and communicating with said first oil passage and a third oil passage defined in an oil pipe adapted to extend between said stationary member and said hydraulic control means to hydraulically connect said second oil passage to said hydraulic control means.

2. A transmission casing including a hydraulic clutch as claimed in claim 1, wherein said first oil passage is defined in said transmission shaft, said stationary member is loosely fitted on said transmission shaft, and said stationary member defines said second oil passage.

3. A transmission casing including a hydraulic clutch as claimed in claim 1, wherein said oil pipe has one end thereof attached to said stationary member and the other end thereof adapted for insertion into said hydraulic control means when the cover is attached to the transmission case, whereby said oil pipe is connected to the hydraulic control means.

4. A transmission casing including a hydraulic clutch as claimed in claim 1, wherein said oil pipe has one end thereof attached to said hydraulic control means and the other end thereof adapted for insertion into said stationary member when the cover is attached to the transmission case, whereby said oil pipe is connected to said stationary member.

5. A transmission casing including a hydraulic clutch as claimed in claim 1, wherein said first oil passage is defined in an output shaft of said hydraulic clutch and said second oil passage is defined in a supporting boss of a bearing for supporting said output shaft.

6. A transmission casing including a hydraulic clutch as claimed in claim 1, which includes a hydraulic actuator secured onto an inner face of said cover, said hydraulic actuator being connected to an oil source for actuating said hydraulic control means.

7. A transmission casing including a hydraulic clutch as claimed in claim 6, wherein said hydraulic actuator is adapted to operate a change speed device mounted in said transmission case.

8. A transmission casing including a hydraulic clutch as claimed in claim 7, wherein said cover defines an oil passage interconnecting said hydraulic control means and said hydraulic actuator.

9. A transmission casing including a hydraulic clutch as claimed in claim 1, wherein said transmission casing includes therein position setting means for setting a position of said hydraulic control means.

10. A transmission casing including a hydraulic clutch as claimed in claim 9, wherein said position setting means includes knock pins placed to extend through openings defined in said hydraulic control means.

11. A transmission casing including a hydraulic clutch as claimed in claim 10, wherein said position setting means includes a stepped portion engageable with said hydraulic control means.

* * * * *